United States Patent [19]

Thompson, Jr. et al.

[11] Patent Number: 5,259,327
[45] Date of Patent: Nov. 9, 1993

[54] PROCESS FOR KILLING SOIL PATHOGENS

[75] Inventors: James E. Thompson, Jr., Winter Haven, Fla.; A. H. J. Rajamannan, Minneapolis, Minn.

[73] Assignee: Aqua Heat Inc., Minneapolis, Minn.

[21] Appl. No.: 14,853

[22] Filed: Feb. 8, 1993

[51] Int. Cl.⁵ .............................. F01C 23/00
[52] U.S. Cl. ..................... 111/118; 47/1.42; 111/127; 111/128; 172/1; 405/128; 405/263
[58] Field of Search ............ 405/128, 129, 258; 172/1, 776; 111/200, 128, 118, 127; 47/1.3, 1.42, 1 F, 1.43

[56] References Cited

U.S. PATENT DOCUMENTS

| | | | |
|---|---|---|---|
| 682,171 | 9/1901 | Cartter | 47/1 F |
| 1,021,529 | 3/1912 | Johnson | 111/127 X |
| 2,350,721 | 6/1944 | Brown | 47/1 F |
| 2,448,265 | 8/1948 | Kagy et al. | 111/200 X |
| 2,625,123 | 1/1953 | Morgan | 47/1.42 X |
| 3,443,885 | 5/1969 | Scholtus | 47/1.42 X |
| 3,834,330 | 9/1974 | Wallace | 111/126 |
| 4,063,523 | 12/1977 | Olsson | 111/128 X |
| 4,479,444 | 10/1984 | Takata | 111/118 |

*Primary Examiner*—Dennis L. Taylor
*Attorney, Agent, or Firm*—Herman H. Bains

[57] ABSTRACT

A process for killing soil pathogens to improve agricultural production includes the steps of treating a field with a soil conditioning agent to reduce the clods in the soil to microaggregates. Hot water is applied to the treated soil at varying depths to kill soil borne organisms. Beneficial organisms are then applied to the sterilized soil to repopulate the soil with these beneficial organisms.

6 Claims, 1 Drawing Sheet

PROCESS FOR KILLING SOIL PATHOGENS

FIELD OF THE INVENTION

This invention relates to a process for killing soil pathogens for the purpose of improving agricultural production.

BACKGROUND OF THE INVENTION

Pathogenic organisms such as nematodes, wire worms, cut worms, fungal and bacterial pathogens residing in soils cause major economic damage to crops that are grown in such pathogen-infested soils. At present, these pathogens are controlled by chemical pesticides. However, chemical pesticides are quite hazardous to farmers and the environment and will be phased out of use in the coming decade by anticipated regulations.

Soils in greenhouses have been sterilized by pipes buried under the soil which are conduits for heated water or steam piped through these buried pipes. This technology cannot be used in open fields, where it is economically impossible to bury acres and acres of pipes.

Soils differ in their physical makeup. Soils are classified as clay, clay loam, loam, and sandy. All of these types of soils are encountered in agricultural production. These soils, however, sandy, tend to form clods and these clods can be of varying sizes. Such clods, especially from clayey soils, can be as hard as stone. The pathogen's eggs, larvae and adults are normally inside these clods. When hot water or steam is used to sterilize the different varieties of soils, the hot water or heat generated by the hot water or steam does not get to the pathogens located inside the clods. Therefore only a partial kill of the organisms is achieved.

Attempts have been made to use steam and super heated steam to sterilize soil. However, in practice, this system does not work as the steam escapes through fissures in the soil into the atmosphere and is quite ineffective. The present invention is directed to the preparation of the soil to be sterilized and thereafter sterilizing the soil with hot water under pressure.

SUMMARY OF THE INVENTION

It is an object of this invention to provide a novel method so that soil is first conditioned with a conditioning agent to open up the soil and clods into microaggregates, and the conditioned soil is thereafter subjected to hot water under pressure which kills substantially all of the soil borne life forms.

The soil conditioning agent may be a biological or chemical conditioning agent. In one embodiment of the invention, the soil conditioner is a biological soil conditioner while in other embodiments, the soil conditioner comprises chemical conditioning agent. The injection of hot water into the conditioned soil may be accomplished by using conventional agricultural equipment that allows the injection to occur at various preselected levels while the implement is moved through the field.

FIGURES OF THE DRAWING

FIG. 1 is a diagrammatic view of a conventional agricultural sod busting implement that can be advantageously used with the present process and, FIG. 2 is a diagrammatic view of one of the tools of implement of FIG. 1 illustrating the location of nozzle outlets that may be used in the present process.

DESCRIPTION OF THE PREFERRED EMBODIMENT OF THE INVENTION

Figure 1:
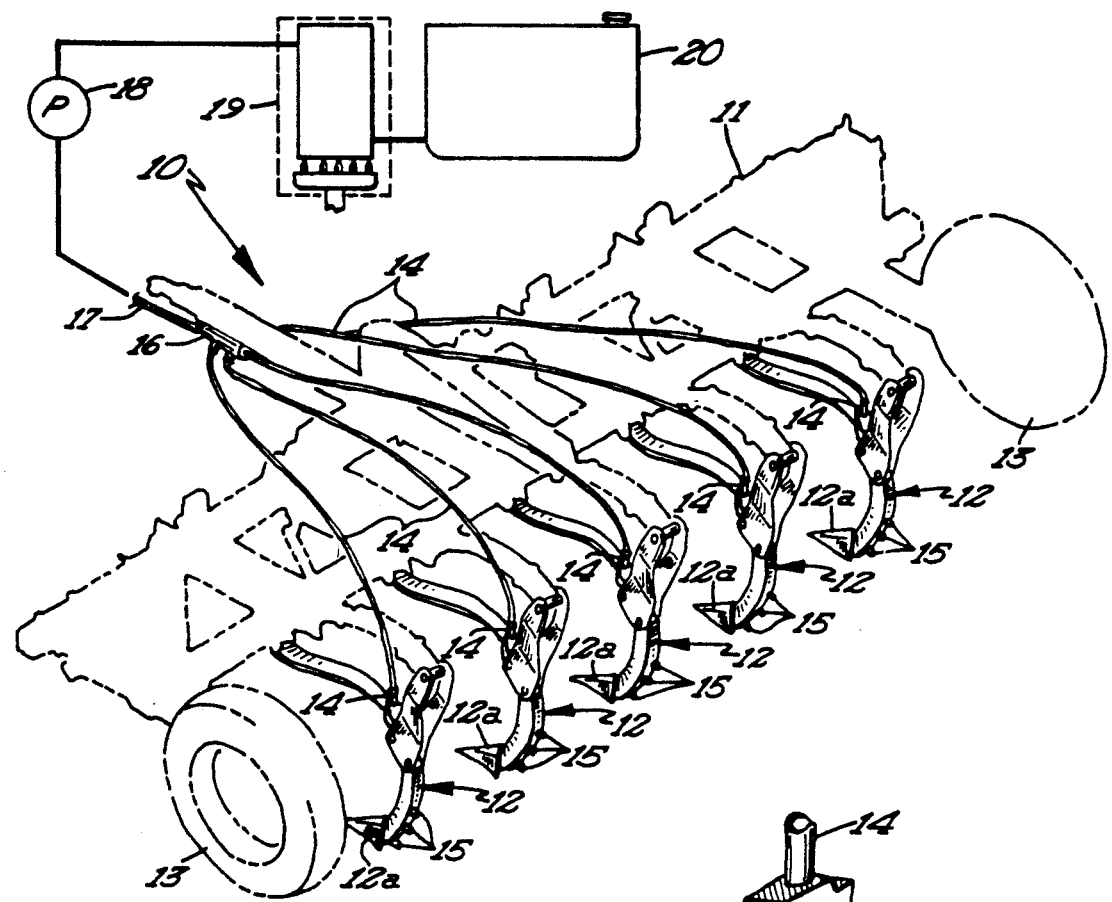
Figure 2:
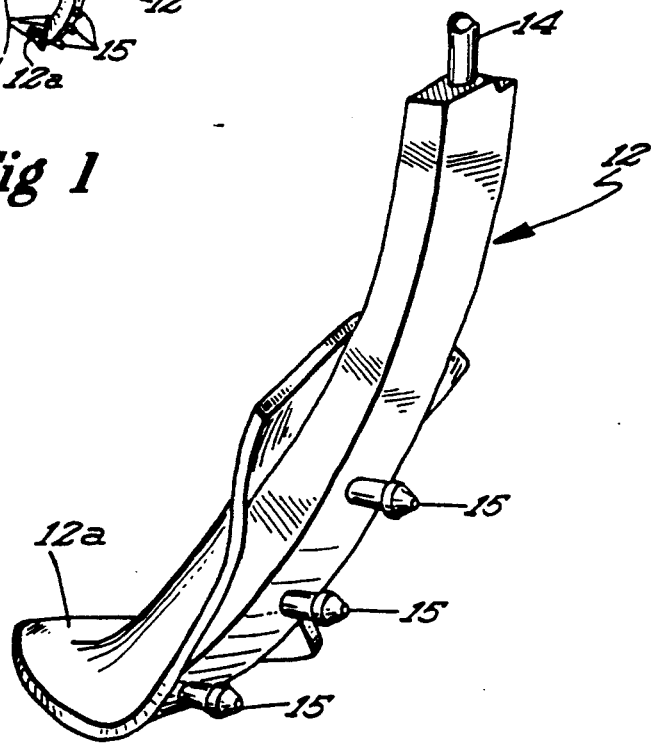

The present process uses hot water which is injected into the soil of the field to kill pathogenic organisms such as nematodes, wire worms, cut worms, fungal and bacterial pathogens residing in the soil to thereby improve agricultural production of the field. Agricultural fields are first tilled with conventional commercial agricultural implements to break the soil down in order to provide aeration and porosity to the soil to effectively grow agricultural crops. It has been found that regardless of the makeup of the soil, the fields tend to have clods and these clods can vary in size and can also vary in hardness. In the clay soils, the clods may become hard as stone. Many of the soil borne pathogenic organisms are found within the clods and if the soil is sterilized with steam or hot water, neither the steam nor the hot water will penetrate the clods. Therefore one can achieve only a partial kill of the organisms. One of the beneficial steps of the present process is to treat the soil with a soil conditioning agent to open up the soil and clods into microaggregates so that the injected hot water will kill the soil borne organisms.

The soil conditioning agent may be either a biological soil conditioner or a chemical soil conditioner. For example, a biological soil conditioner (bacterial enzyme) which works extremely well is the commercial soil conditioner sold under the trademark Super Symbex by Agro-K Corporation of Minneapolis, Minn. A chemical soil conditioner which is highly effective in treating the soil is ammonium laureth sulfate also sold by Agro-K Corporation and which is effective in reducing clods to microaggregates. These soil conditioning agents allow water to penetrate inside the clods by altering the charge between soil particles which permits faster penetration of water into the crevices of the clods.

The hot water which is injected into the soil must have a temperature of sufficient magnitude in order to be lethal to soil borne organisms. Therefore the heated water when injected into the soil has a temperature of 100° F. to 210° F. It is also necessary to have the water injected under pressure into the soil in order to effectively penetrate the soil and kill the soil borne organisms. In this regard, it is preferred that the pressure of injection of the hot water be within the range of 50 psi to 30,000 psi.

Since the present process is directed to treating entire fields which are infected with pathogenic organisms, it is necessary that the means of carrying out the present process comprise a mobile system that is moved through the field as the soil is sterilized.

Referring now to the drawings, it will be seen that a conventional agricultural implement, designated generally by the reference numeral 10, for tilling a field is thereshown. The implement 10 is a towed type implement and includes a frame 11 which supports a plurality of subsurface tools 12 which are in the form of spring type shovels. The implement is provided with ground engaging wheels 13 which are adjustable in the usual fashion to vary the depth of penetration of the soil by the tools 12. It will be appreciated that the wheels may be vertically adjusted to shift the agricultural implement between a selected lowered operative position and an elevated transport position.

The tools 12 include conventional spring shank shovels 12a and the shovels are connected by spring shank to the tool frame 11 in the embodiment shown, elongate conduits 14 extend through the standard of the tools 12 and the conduit is provided with a plurality of vertically spaced apart discharge nozzles 15 which project through the tool shank. Although only three nozzles have been illustrated diagrammatically in the drawings, it is pointed out that any number of discharge nozzles may be provided to discharge hot water therethrough at various subsurface levels of the soil.

The conduits 14 are connected to a manifold 16 and the manifold 16 is connected to a pump 18 preferably carried by the tractor or other towing vehicle. Hot water and/or the soil conditioning agent are contained within a reservoir 20 which is connected in communicating relation to a heating device 19 that continuously heats the water before it is supplied to the conduits 14 by the pump 18.

During use of the implement, the tools 12 will penetrate below the surface of the field to be treated so that the injection nozzles will inject hot water at locations between approximately three inches and twentyfour inches.

When a soil conditioner is applied to the soil, it is preferred that the soil conditioner be applied by irrigation or be entrained in water to effectively cover the field to be treated. Therefore hot water may be injected into the soil after a predetermined selected time including one day after the pretreatment or several days after pretreatment. In some instances, the hot water and soil conditioning agent may be simultaneously applied to the fields being treated.

Since the sterilization steps also destroys beneficial organisms, the sterilized soil is repopulated by injection of naturally ocurring bacteria, fungus and yeast in a culture medium.

The following examples are illustrative of fields treated using the present process:

EXAMPLE I

Plots were selected in a carrot field where nematodes infestation was a historical problem. Soil samples were removed for analysis of eggs, larvae and adult nematodes. Pretreatment, 6 days post-treatment and 21 days post-treatment samples were taken and analyzed for eggs, larvae and adults.

Soils in the treatment area were pre-treated with Super Symbex (a biological soil conditioner, product of Agro-K Corporation of Minneapolis, Minn.). A week later, hot water was injected at 3 inch, 6 inch, and 12 inch levels and distributed along the entire volumetric area of the test plots. Natural temperature of soil at treatment time was 72° F. Post injection of hot water, soil temperatures of 120° F. was reached. Chemical penetrant was added to the hot water at the time of treatment to facilitate maximum penetration of hot water into all the areas in the treated plot down to 14 inches.

|  | *RESULTS LOAMY SOIL | | |
|---|---|---|---|
|  | EGGS | LARVAE | ADULT |
| Pre-Treatment | 60 | 74 | 118 |
| 6 Days Post-Treatment | 0 | 3 | 6 |
| 21 Days Post-Treatment | 0 | 2 | 0 |

|  | *RESULTS LOAMY SOIL | | |
|---|---|---|---|
|  | EGGS | LARVAE | ADULT |
| Untreated - 21 Days | 76 | 64 | 130 |

*The results show a significant drop in Pathogenic egg. larvae and adults.

EXAMPLE II

Potato fields with a history of Rhyzoctonia were split into treated and untreated plots. Pre-treatment and post-treatment counts were made on the soil samples for pathogenic fungal counts.

Treated areas received a chemical preparation that was irrigated in with 4 inches of irrigation. The chemical used was ammonium laureth sulfate (soil conditioner sold by Agro-K Corporation). One day post-preparation treated plots were treated with hot water to a depth of 24 inches. Injections were made at 3 inches, 6 inches, 9 inches, 12 inches, 15 inches, 19 inches. 24 inches below the surface of soil. No additional chemical or biological additive was used as the soil was sandy.

|  | *RESULTS SANDY SOIL RHYZOCTONIA COUNTS |
|---|---|
| Pre-Treatment | 62 |
| 12 Days Post-Treatment | 5 |
| Untreated - 12 Days Post-treatment | 74 |

EXAMPLE III

Tomato fields with a history of phytopthera were selected and split into test plots.

Pre-treatment and post-treatment soil samples were analyzed for phytopthera counts.

Pre-treatment Super Symbex was applied via irrigation. Six inches of irrigation were used to soak the soil with the conditioning agent.

A 0.001 percent solution of chemical soil conditioner ammonium laureth sulfate (sold by Agro-K Corporation) was admixed with the hot water.

Results showed a virtual disappearance of phytophera on the treated plots.

Seven days post-treatment; water mixed with a culture (beneficial bacteria) of sacchoromyces cervecii, actinomyces thermophillus was watered into the test plots and 24 hours later, a total biological count was taken.

The soil treated with the culture showed a very high population count of the beneficial bacteria.

What is claimed is:

1. A process for killing soil pathogens in a field for the purpose in improving agricultural production of the field, comprising the steps of, providing a mobile supply of hot water under pressure, the hot water having a temperature within the range of 100° F. to 210° F., directing the hot water under pressure to a plurality of mobile discharge media, each discharge media having a plurality vertically spaced apart discharge outlets located at varying depths below the surface of the field to be treated, discharging the hot water from the outlets at various subsurface depths of the field to be treated at a pressure within the range of 50 psi to 30,000 psi as the moveable discharge media are moved through the field whereby the pressurized hot water will penetrate the soil of the field being treated to continuously kill soil borne organisms including pathogenic organisms.

2. A process for killing soil pathogens in a field for the purpose of improving agricultural production of the field, comprising the steps of, applying a soil conditioning agent to the field, said soil conditioning agent being selected from the group consisting of biological soil conditioning agents and chemical soil conditioning agents, the soil conditioning agent penetrating the clods to cause the clods to disintegrate into microaggregates, providing a mobile supply of hot water under pressure, the hot water having a temperature within the range of 100° F. to 210° F., directing the hot water under pressure to a plurality of mobile discharge media, each discharge media having a plurality of vertically spaced apart discharge outlets located at varying depths below the surface of the field to be treated, discharging the hot water from the outlets at various subsurface depths of the field to be treated at a pressure within the range of 50 psi to 30,000 psi as the moveable discharge media are moved through the field whereby the pressurized hot water will penetrate the soil of the field being treated to continuously kill soil borne organisms including pathogenic organisms.

3. A process for killing soil pathogens in a field containing clods for the purpose of improving agricultural production of the field, comprising the steps of, providing a mobile supply of hot water under pressure and a mobile supply of a soil conditioning agent, said hot water under pressure having a temperature within the range of 100° F. to 210° F., said soil conditioning agent being selected from the group consisting of biological soil conditioning agents and chemical soil conditioning agents, directing the hot water under pressure and the soil conditioning agent to a plurality of mobile discharge media, each discharge media having a plurality of vertically spaced apart outlets located at varying depths below the surface of the field to be treated, simultaneously discharging the hot water and soil conditioning agent from the outlets at varying subsurface depths of the field to be treated at a pressure within the range 50 psi to 30,000 psi as the moveable discharge media are moved through the field whereby the soil conditioning agent will penetrate and disintegrate the clods in soil into microaggregates, and the pressurized hot water will penetrate the soil of the field to continuously kill soil borne organisms including pathogenic organisms.

4. The process as defined in claim 2 and thereafter injecting the sterilized treated soil with naturally occurring bacteria, fungus and yeast in a culture medium.

5. The process as defined in claim 2 wherein said soil conditioning agent comprises ammonium laureth sulfate.

6. The process as defined in claim 2 wherein said soil conditioning agent is a bacterial enzyme.

* * * * *